United States Patent
Viktorov et al.

(10) Patent No.: US 10,908,943 B1
(45) Date of Patent: *Feb. 2, 2021

(54) BROWSER CREDENTIAL MANAGEMENT FOR TERMINAL SERVER SESSIONS

(71) Applicant: Parallels International GmbH, Schaffhausen (CH)

(72) Inventors: Sergey Viktorov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 6 days.

This patent is subject to a terminal disclaimer.

(21) Appl. No.: 16/394,336

(22) Filed: Apr. 25, 2019

Related U.S. Application Data

(62) Division of application No. 15/472,488, filed on Mar. 29, 2017, now Pat. No. 10,331,471.

(51) Int. Cl.
| | |
|---|---|
| *G06F 9/455* | (2018.01) |
| *G06F 9/445* | (2018.01) |
| *G06F 21/45* | (2013.01) |

(52) U.S. Cl.
CPC ...... *G06F 9/45558* (2013.01); *G06F 9/44526* (2013.01); *G06F 21/45* (2013.01); *G06F 2009/45587* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 5,852,717 A | 12/1998 | Bhide et al. | |
| 8,191,062 B2 * | 5/2012 | Grobman | G06F 9/5077 713/300 |
| 9,459,984 B2 * | 10/2016 | Bratanov | G06F 9/45533 |
| 2005/0240828 A1 | 10/2005 | Rothman et al. | |
| 2010/0241688 A1 | 9/2010 | Hazlewood et al. | |

OTHER PUBLICATIONS

Kinlan, Paul, "Thoughts on the Credential Management API", 4 pages, Jul. 15, 2016.
Parallels, Parallels Desktop 12 for Mac, User's Guide, http:download.parallels.com/desktop/v12/docs/en_US/Parallels%20Desktop%20User's%20Guide.pdf, 2016, 222 pages.
USPTO, Office Action for U.S. Appl. No. 15/472,488, dated Oct. 1, 2018.
USPTO, Notice of Allowance for U.S. Appl. No. 15/472,488, dated Feb. 11, 2019.

* cited by examiner

*Primary Examiner* — Charlie Sun
(74) *Attorney, Agent, or Firm* — Rosenberg, Klein & Lee

(57) ABSTRACT

Systems and methods for browser credential management for terminal server sessions. An example method comprises: receiving, by a terminal server, a credential manager API request intercepted by a hook module installed into a browser running within a terminal session managed by the terminal server; forwarding the intercepted API request to a terminal service client application running on a client computer system; receiving, from the terminal service client application, a client response to the intercepted API request; producing, using the client response, a terminal server response to the intercepted API request; and forwarding the terminal server response to the hook module.

20 Claims, 8 Drawing Sheets

BROWSER CREDENTIAL MANAGEMENT FOR TERMINAL SERVER SESSIONS

RELATED APPLICATIONS

This application is a divisional of U.S. patent application Ser. No. 15/472,488 filed on Mar. 29, 2017, entitled "Browser Credential Management for Virtual Execution Environments," the entire content of which is incorporated by reference herein.

TECHNICAL FIELD

The present disclosure is generally related to computer systems, and is specifically related to systems and methods for browser credential management for virtual execution environments, including virtual machines and terminal services.

BACKGROUND

Virtualization may be viewed as abstraction of hardware components into logical objects in order to allow a computer system to execute various software modules, for example, multiple operating systems, concurrently and in isolation from other software modules. Virtualization may be achieved by running a software layer, often referred to as a "virtual machine monitor," above the hardware and below the virtual machines. The virtual machine monitor may abstract the physical layer and present this abstraction to virtual machines to use, by providing interfaces between the underlying hardware and virtual devices of virtual machines. For example, processor virtualization may be implemented by the hypervisor scheduling time slots on one or more physical processors for a virtual machine, rather than a virtual machine actually having a dedicated physical processor.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
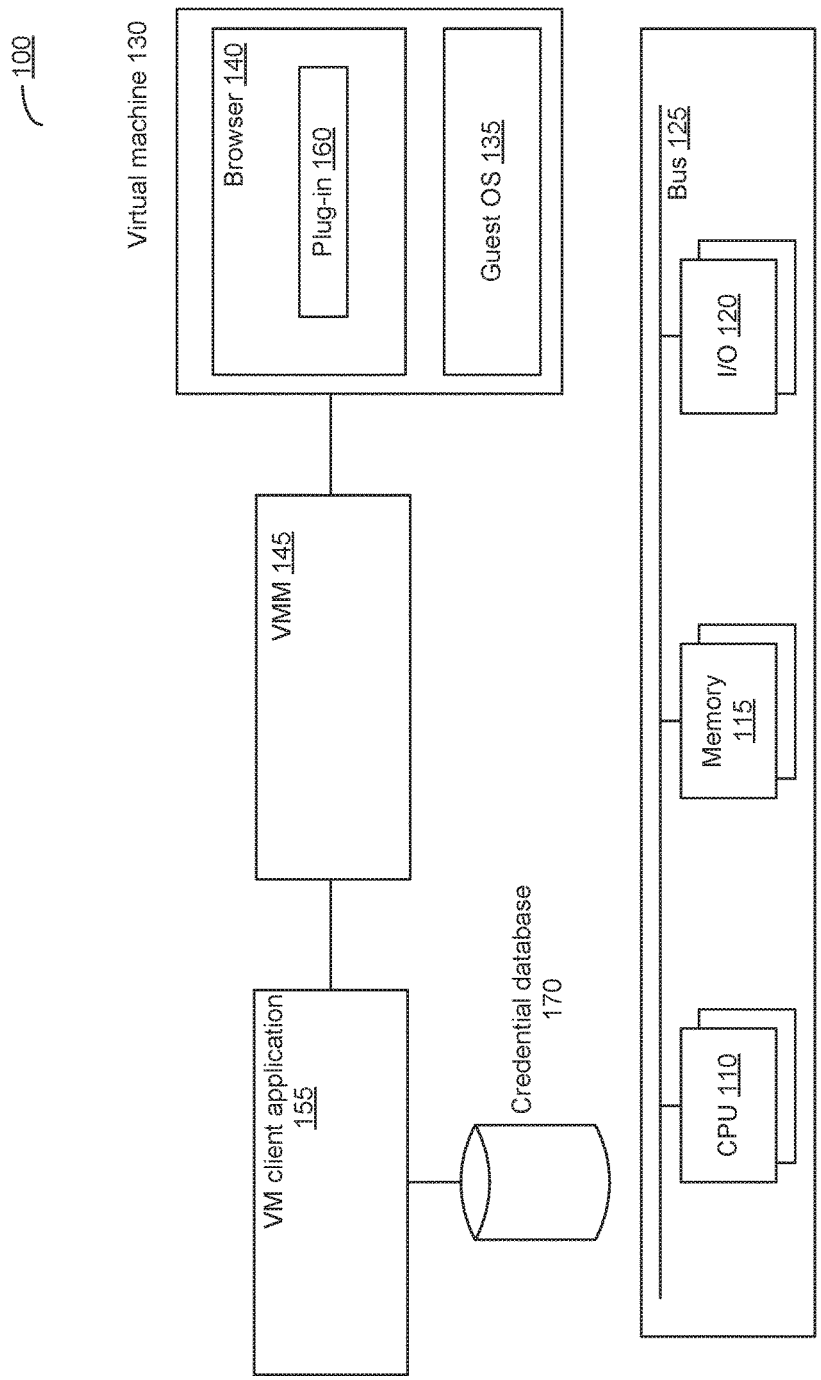
FIG. 1 depicts a high-level diagram of an example computer system 100 running a VMM managing one or more virtual machines in which the systems and methods described herein may be implemented.

Described herein are systems and methods for browser credential management for virtual execution environments, including virtual machines and terminal sessions.

Various operating systems (e.g., Windows® operating system) implement credential managers for securely storing login credentials (including account identifiers and associated passwords) for various computers, servers, and/or services. Modern web browsers employ the credential management functionality for relieving the user from the mundane tasks of keying in login credentials for various online services. However, while functioning correctly for non-virtualized personal computer environments, common credential management methods are not well suited for virtual execution environments, such as virtual machines or terminal sessions.

In an illustrative example, a virtual execution environment may be implemented by a virtual machine running one or more guest applications under a guest operating system (OS) and managed by a virtual machine monitor (VMM). The VMM may emulate the underlying hardware platform (e.g., the x86 platform), including emulating the processor, memory, and peripheral devices (such as network interface controllers, hard disk controllers, etc.). In another illustrative example, a virtual execution environment may be implemented by a terminal session (also referred to as "remote desktop session") running on a multi-user terminal server (also referred to as "remote desktop server") in communication with a terminal service client application running on a client computer.

Another common approach to credential management involves employing a third-party credential manager which may utilize a browser plug-in to replace the native browser credential management functionality with a third-party implementation that utilizes a cloud-based storage for storing the login credentials. However, the browser security model may restrict plug-in capabilities, thus preventing the third-party credential manager from installing a plug-in substituting the native credential management functionality. Furthermore, utilizing a third-party credential manager would involve storing login credentials in a cloud-based storage, which may not be acceptable for certain categories of users because of their organizational security policies or simply their security concerns which may be driven by their lack of trust into the ability of a cloud-based storage to provide adequate security levels. Furthermore, utilizing a cloud-based storage may involve a recurring cost which may not be acceptable for certain categories of users.

The present disclosure alleviates the above-noted and various other deficiencies of common credential management methods, by providing systems and methods for browser credential management for virtual execution environments which involve installing one or more hooks for intercepting certain credential manager application programing interface (API) calls issued by a browser that runs in a virtual execution environment (such as on a virtual machine or within a terminal session).

In an illustrative example, the virtual execution environment may be implemented by a virtual machine managed by a VMM. Upon intercepting a credential manager API call, a hook installed into the browser running on a virtual machine may forward the intercepted API request to the VMM, which may, in turn, forward the API call to the associated VM client application running on the client computer. Upon resolving the request using the local credential database that is stored on the client computer, the VM client application may return the response to the VMM, which, in turn, may forward the response to the browser. In an illustrative example, the intercepted API call may include a request to retrieve an item from the credential database may specify the resource (e.g., an online service) for which the credentials are requested, and the response to the API call may include the account identifier and the password associated with the specified resource.

In certain implementations, in parallel with forwarding the intercepted API request to the VM client application, the VMM may also forward the intercepted API request to the original credential manager API implemented by the virtual execution environment, and select, among the responses returned by the VM client application and the credential manager, the response which has the most recent timestamp. The selected response may then be forwarded to the browser, as described in more detail herein below.

In another illustrative example, the virtual execution environment may be implemented by a terminal session running on a terminal server in communication with a terminal service client application running on a client computer. Upon intercepting a credential manager API call, a hook installed into the browser running within a terminal session may forward the intercepted API request to the terminal server, which may, in turn, forward the API call to the associated terminal service client application running on the client computer. Upon resolving the request using the local credential database that is stored on the client computer, the terminal service client application may return the response to the terminal server, which, in turn, may forward the response to the browser running within the terminal session, as described in more detail herein below. In certain implementations, in parallel with forwarding the intercepted API request to the terminal service client application, the terminal server may also forward the intercepted API request to the original credential manager API, and select, among the responses returned by the terminal service client application and the credential manager, the response which has the most recent timestamp. The selected response may then be forwarded to the browser running within the terminal session, as described in more detail herein below.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 depicts a high-level diagram of an example computer system 100 running a VMM managing one or more virtual machines in which the systems and methods described herein may be implemented. The computer system 100 may include one or more central processing units (CPU, also referred to as "processors" herein) 110, which may be communicatively coupled to one or more memory devices 115 and one or more input/output (I/O) devices 120 via a system bus 125.

"Processor" herein refers to a device capable of executing instructions handling data in registers or memory, encoding arithmetic, logical, control flow, floating point or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module. A processor may also be referred to as a central processing unit (CPU). "Memory device" herein refers to a volatile or non-volatile memory, such as RAM, ROM, EEPROM, or any other device capable of storing data. "I/O device" herein refers to a device capable of inputting and/or outputting binary data. In an illustrative example, an I/O device may be provided by a network interface controller (NIC) or a block I/O device, such as a hard disk controller.

In accordance with one or more aspects of the present disclosure, the computer system 100 may implement a virtual execution environment for executing code that may have been originally developed for other platforms. The virtual execution environment may include one or more virtual machines 130, each of which may run a guest OS 135 managing one or more guest applications, such as a browser 140.

Execution of the virtual machine 130 may be facilitated by the VMM 145 that may emulate the underlying hardware platform (e.g., the x86 platform), including emulating the processor, memory, and peripheral devices (e.g., network interface controllers, hard disk controllers, etc.). In certain implementations, the VMM 145 may be executed in a separate privileged context, which is isolated from the kernel context of the host computer system 100. Alternatively, the VMM 145 may be executed in the host kernel context and the host user space context. The VMM 145 may utilize various suitable APIs for privileged-level access to the host platform, including the processor 110, memory 115, and peripheral devices 120 (e.g., network interface controllers, hard disk controllers, etc.).

For improving efficiency and portability of the virtualization architecture, certain virtual machine functions may be performed by one or more instances of the VM client application 155 communicating with the virtual machine 130 via the VMM 145. The VM client application 155 may run in a non-privileged execution mode (e.g., at the current privilege level (CPL) of 3) in the user space of the host computer system 100. The VM client application 155 may utilize various host APIs for accessing host functions, e.g., system calls implementing I/O functions. A credential manager plug-in module 160 installed in the browser process 140 may implement the browser credential management methods described herein.

Figure 2:
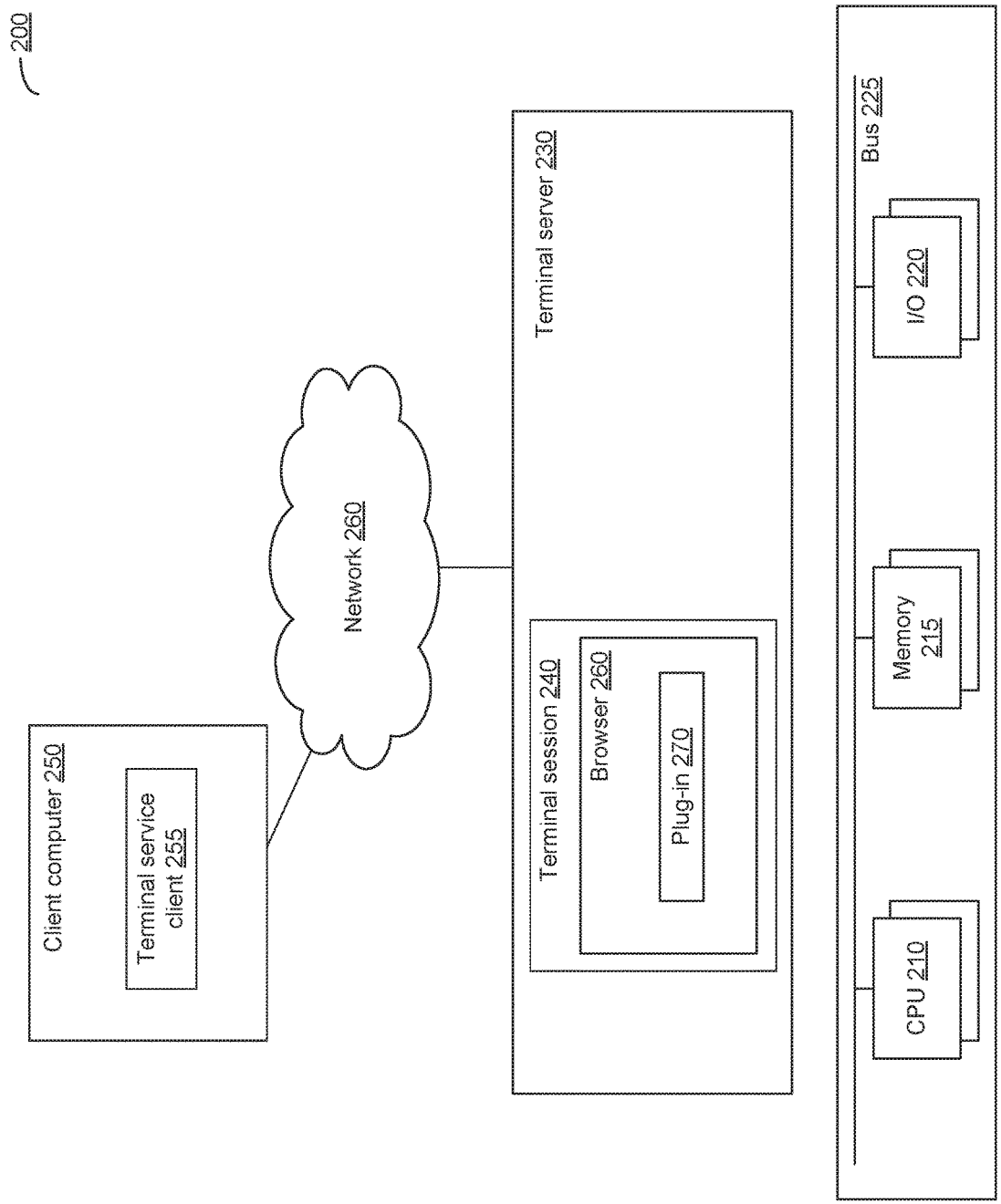
FIG. 2 depicts a high-level diagram of an example computer system 200 implementing a terminal server managing one or more terminal sessions, in which the systems and methods described herein may be implemented.

FIG. 2 depicts a high-level diagram of an example computer system 200 implementing a terminal server managing one or more terminal sessions, in which the systems and methods described herein may be implemented. The computer system 200 may include one or more central processing units (CPU, also referred to as "processors" herein) 210, which may be communicatively coupled to one or more memory devices 215 and one or more input/output (I/O) devices 220 via a system bus 225.

In accordance with one or more aspects of the present disclosure, the computer system 200 may implement a terminal server 230 for creating and managing one or more virtual execution environments represented by terminal sessions 240 which run in communication with respective client computer systems 250. Each client computer system 250 may run a terminal service client application 255 that access, e.g., via the Remote Desktop Protocol (RDP) over one or more networks 260, the associated terminal session 240 running on the terminal server 230. Thus, the terminal session 240 provides the processor, memory, and disk resources of the virtual execution environment, while the terminal service client application 255 implements a seamless interface between the terminal session 240 and the display, keyboard, and other I/O devices (e.g., mouse, printers, and/or various USB peripheral devices) of the client computer 250. In an illustrative example, a terminal session 240 may run one or more terminal session applications, such as a browser 260. A credential manager plug-in module 270 installed in the browser process 260 may implement the browser credential management methods described herein.

Figure 3:
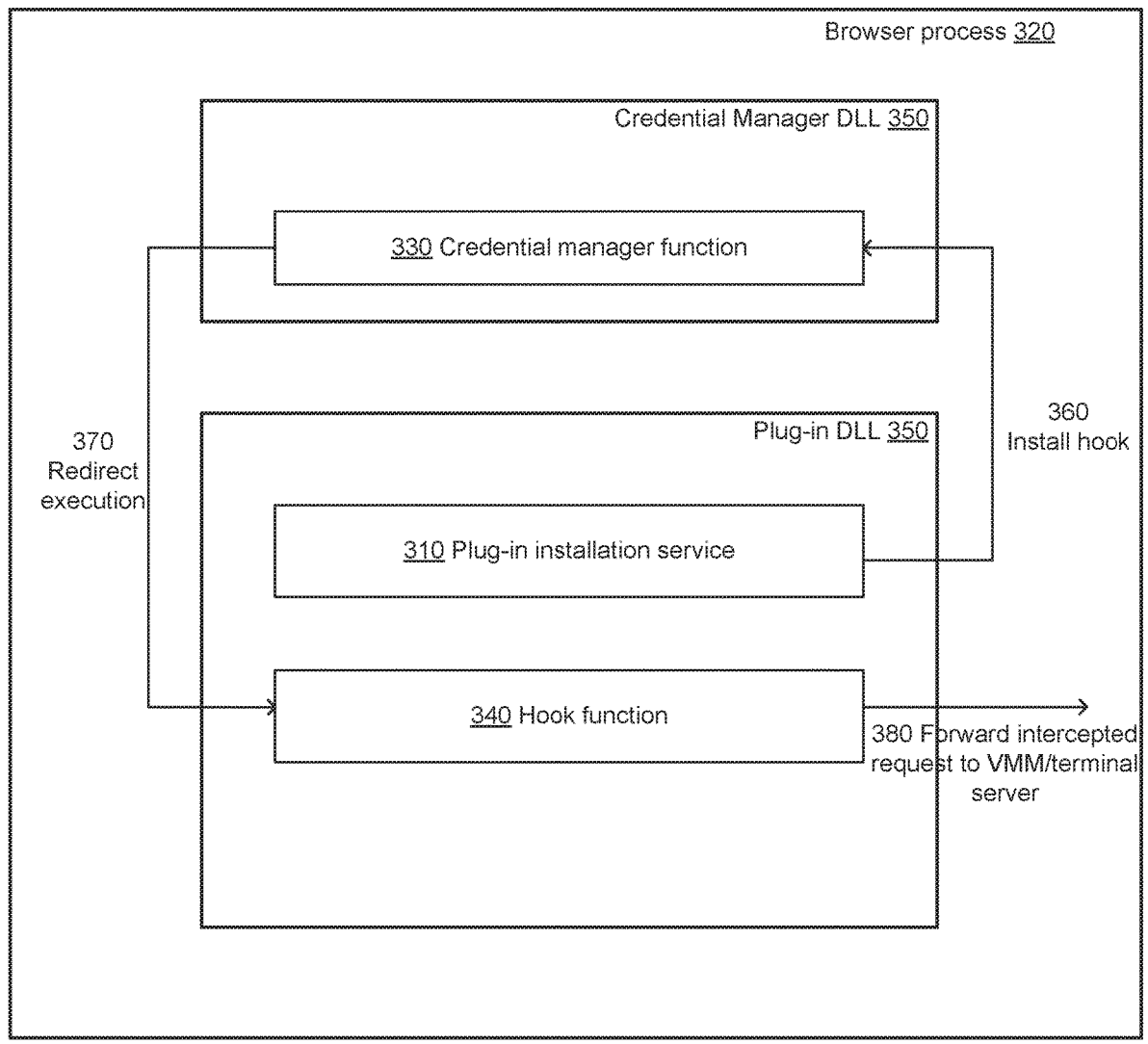
FIG. 3 schematically illustrates a sequence of operations performed by the systems and method described herein for browser credential management for virtual execution environments.

FIG. 3 schematically illustrates a sequence of operations performed by the systems and method described herein for browser credential management for virtual execution environments. As schematically illustrated by FIG. 3, a plug-in installation service 310 may continuously monitor processes running within a virtual execution environment, which may be implemented, e.g., as a virtual machine or a terminal session. Responsive to detecting a new browser process 320 (e.g., a process having a pre-defined name, such as browser_broker.exe or iexplore.exe process), the plug-in installation service 310 may initiate loading of the credential manager plug-in 350, as described in more detail herein below with references to FIG. 4.

Upon initialization, the credential manager plug-in 350 may load the system credential manager (e.g., vaultcli.dll) module 350, and install the hooks (operation 360) into one or more credential manager functions such that their entry points would redirect (operation 370) the execution control to the respective hook functions 340 implemented by the credential manager plug-in 350. Each hook may specify, as a handler for the associated credential manager API call 330, a hook function 340 identified by the entry point in the credential manager plug-in dynamic link library (DLL) 340.

In various illustrative examples, the intercepted credential manager calls may include a request to enumerate items in a credential database, a request to find items in the credential database, a request to retrieve an item from the credential database, a request to add an item to the credential database, and/or a request to remove an item from the credential database.

Upon intercepting a credential manager API call 330 issued by the browser 320, the hook function 340 may forward (operation 380) the intercepted API request to the virtualization server (e.g., represented by the VMM 145 of FIG. 1 or terminal server 230 of FIG. 2), which may, in turn, forward the API call to the associated virtualization client application (e.g., VM client application 155 of FIG. 1 or terminal service client application 255 of FIG. 2). Upon resolving the request using the local credential database (e.g., database 170 of FIG. 1), the virtualization client application may return the response to the virtualization server, which, in turn, may forward the response to the hook function 340 for supplying the response to the browser 320.

In an illustrative example, the intercepted API call may include a request to retrieve an item from the credential database may specify the resource (e.g., an online service) for which the credentials are requested, and the response to the API call may include the account identifier and the password associated with the specified resource.

In certain implementations, in parallel with forwarding the intercepted API request to the virtualization client application, the virtualization server may also forward the intercepted API request to the original credential manager API implemented by the virtual execution environment (e.g., the guest OS 135 of FIG. 1 or a terminal session 240 of FIG. 2), and select, among the responses returned by the virtualization client application and the original credential manager API, the response which has the most recent timestamp. The selected response may then be forwarded to the hook function 340 for supplying the response to the browser 320. In an illustrative example, the response to the API call may include the account identifier and the password associated with the resource (e.g., an online service) specified by the intercepted API call.

In certain implementations, upon initializing the virtual execution environment (e.g., a virtual machine or a terminal session), the virtualization server application may forward, to the virtual execution environment, the credential manager data stored in the local database on the client computer. Upon receiving the credential manager data, the virtual execution environment may store the data in the credential database associated with the virtual execution environment.

Figure 4:
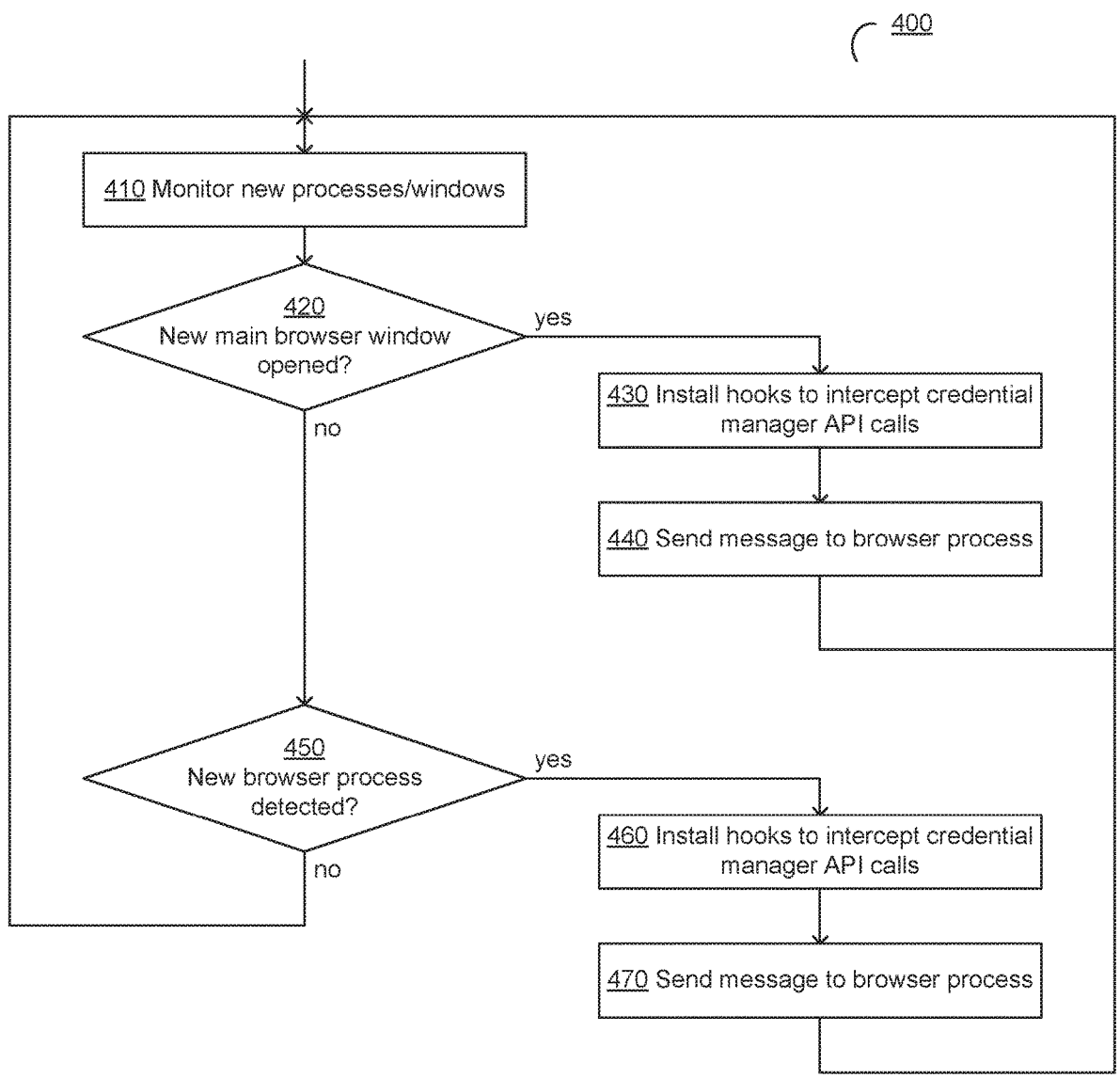
FIG. 4 depicts a flow diagram of an example method of installing one or more hooks to intercept credential manager API calls by the credential manager plug-in, in accordance with one or more aspects of the present disclosure.

FIG. 4 depicts a flow diagram of an example method 400 of installing one or more hooks to intercept credential manager API calls by the credential manager plug-in 240 of FIG. 2, in accordance with one or more aspects of the present disclosure. The method 400 and/or each of its individual functions, routines, subroutines, or operations may be performed by the plug-in installation service 310 of FIG. 3 running within a virtual execution environment (e.g., a virtual machine 130 of FIG. 1 or terminal session 240 of FIG. 2) implementing the method. In certain implementations, the method 400 may be performed by a single processing thread. Alternatively, the method 400 may be performed by two or more processing threads, each thread executing one or more individual functions, routines, subroutines, or operations of the method. In an illustrative example, the processing threads implementing the method 400 may be synchronized (e.g., using semaphores, critical sections, and/or other thread synchronization mechanisms). Alternatively, the processing threads implementing method 400 may be executed asynchronously with respect to each other.

At block 410, the plug-in installation service running in the virtual execution environment may monitor new processes having been initiated and new windows having been opened in the virtual execution environment.

Responsive to determining, at block 420, that a new main window associated with a browser process has been opened, the installation service may, at block 430, install (e.g., by calling SetWindowsHookEx( ) function) one or more hooks into the browser process to intercept certain credential manager API calls. Each hook may specify a hook function implemented by the credential manager plug-in as a handler for the associated credential manager API call. Responsive to installing the hook, the plug-in installation service may, at block 440, send a message to the browser process, thus triggering loading and activation of the credential manager plug-in, and the method may loop back to block 410.

Responsive to determining, at block 450, that a new browser process (e.g., a process having a pre-defined name, such as browser_broker.exe or iexplore.exe process) has been initiated, the installation service may, at block 460, install (e.g., by calling SetWindowsHookEx( ) function) one or more hooks into the browser process to intercept certain credential manager API calls. Responsive to installing the hook, the plug-in installation service may, at block 470, send a message to the browser process, thus triggering loading and activation of the credential manager plug-in, and the method may loop back to block 410.

Figure 5:
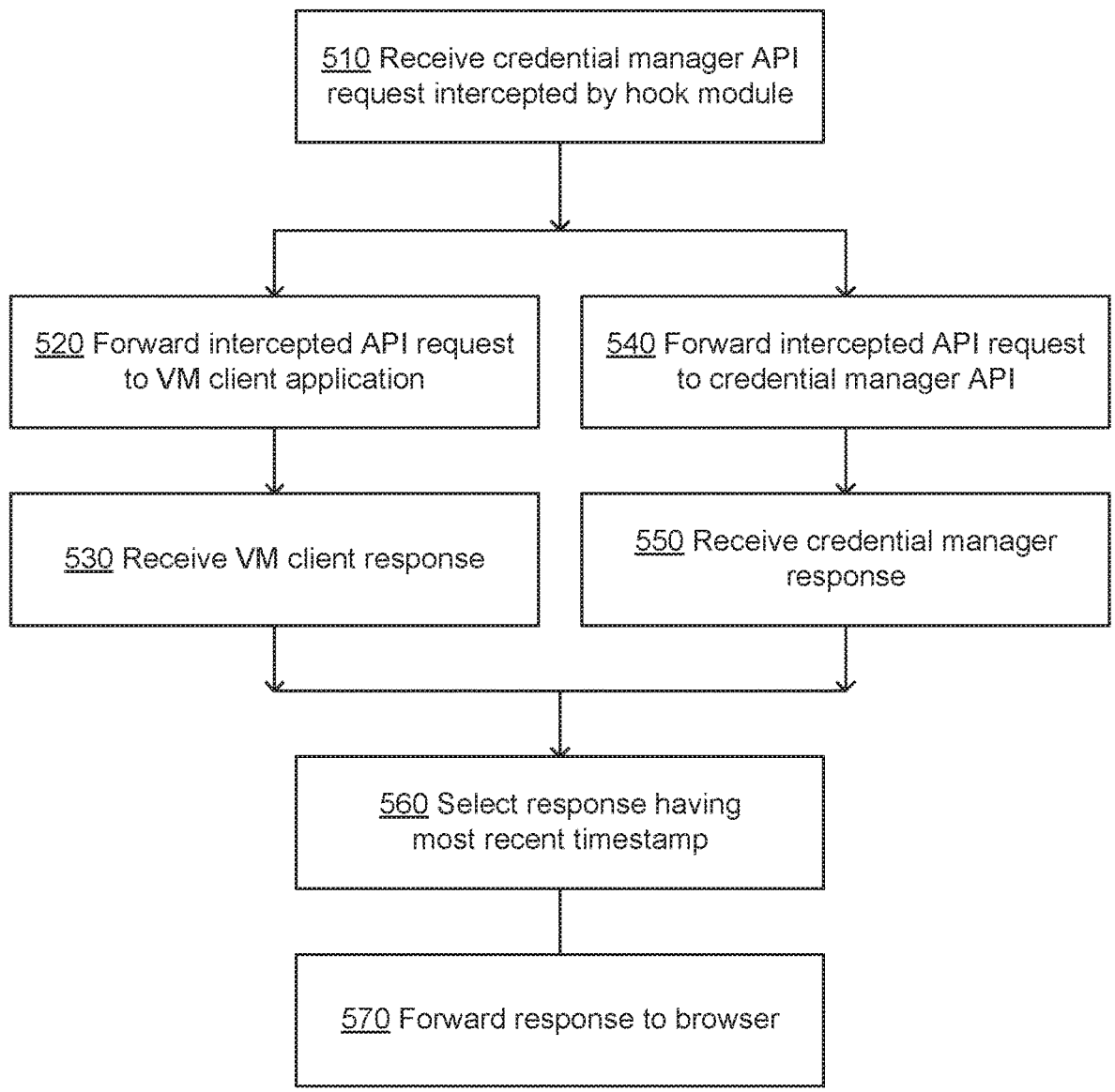
FIG. 5 depicts a flow diagram of an example method of browser credential management for virtual machines, in accordance with one or more aspects of the present disclosure.

FIG. 5 depicts a flow diagram of an example method 500 of browser credential management for virtual machines, in accordance with one or more aspects of the present disclosure. The method 500 and/or each of its individual functions, routines, subroutines, or operations may be performed by the plug-in installation service 310 of FIG. 3 running on a virtual machine implemented by a host computer system (e.g., computer system 100 of FIG. 1) implementing the method. In certain implementations, the method 500 may be performed by a single processing thread. Alternatively, the method 500 may be performed by two or more processing threads, each thread executing one or more individual functions, routines, subroutines, or operations of the method. In an illustrative example, the processing threads implementing the method 500 may be synchronized (e.g., using semaphores, critical sections, and/or other thread synchronization mechanisms). Alternatively, the processing threads implementing method 500 may be executed asynchronously with respect to each other.

At block 510, the VMM running on the host computer system may receive a credential manager API request intercepted by a hook module installed into a browser running on a virtual machine (VM) managed by the VMM. In various illustrative examples, the intercepted credential manager API request may include a request to enumerate items in a credential database, a request to find items in the credential database, a request to retrieve an item from the credential database, a request to add an item to the credential database, and/or a request to remove an item from the credential database.

At block 520, the VMM may forward the intercepted API request to the VM client application, as described in more detail herein above.

At block 530, the VMM may receive a VM client response to the API request. In an illustrative example, the intercepted API call may include a request to retrieve an item from the credential database may specify the resource (e.g., an online service) for which the credentials are requested, and the response to the API call may include the account identifier and the password associated with the specified resource.

At block 540, the VMM may forward the intercepted API request to the credential manager API implemented by the virtual machine, as described in more detail herein above.

At block 550, the VMM may receive a credential manager response to the API request, as described in more detail herein above.

At block 560, the VMM may select, among the responses returned by the VM client application and the credential manager API, the response having the most recent timestamp. In certain implementations, responsive to determining that a timestamp associated with the credential manager response is more recent than a timestamp associated with the VM client application response, the VMM may forward at least part of the credential manager response to the VM client application for updating the client credential database, as described in more detail herein above.

At block 570, the VMM may forward the selected response to the hook module of the browser, and the method may terminate. The browser may forward the credentials (e.g., the account identifier and the associated password) provided by the response to the login page of the online service that has requested the login credentials.

Figure 6:
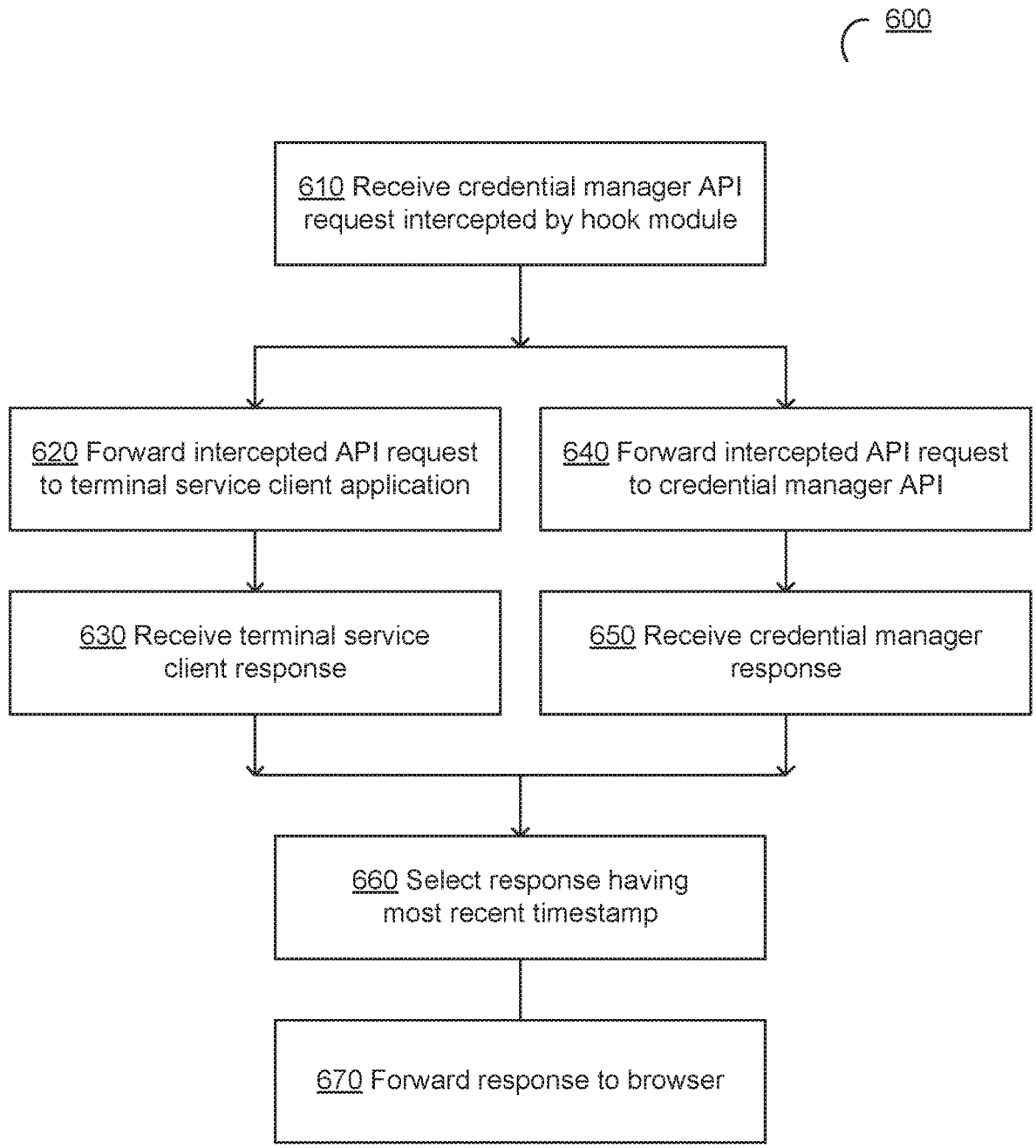
FIG. 6 depicts a flow diagram of an example method of browser credential management for terminal sessions, in accordance with one or more aspects of the present disclosure.

FIG. 6 depicts a flow diagram of an example method 600 of browser credential management for terminal sessions, in accordance with one or more aspects of the present disclosure. The method 600 and/or each of its individual functions, routines, subroutines, or operations may be performed by the plug-in installation service 310 of FIG. 3 running in a terminal session managed by a terminal server (e.g., terminal server 230 of FIG. 2) implementing the method. In certain implementations, the method 600 may be performed by a single processing thread. Alternatively, the method 600 may be performed by two or more processing threads, each thread executing one or more individual functions, routines, subroutines, or operations of the method. In an illustrative example, the processing threads implementing the method 600 may be synchronized (e.g., using semaphores, critical sections, and/or other thread synchronization mechanisms). Alternatively, the processing threads implementing method 600 may be executed asynchronously with respect to each other.

At block 610, the terminal server may receive a credential manager API request intercepted by a hook module installed into a browser running in a terminal session managed by the terminal server. In various illustrative examples, the intercepted credential manager API request may include a request to enumerate items in a credential database, a request to find items in the credential database, a request to retrieve an item from the credential database, a request to add an item to the credential database, and/or a request to remove an item from the credential database.

At block 620, the terminal server may forward the intercepted API request to the terminal service client application running on the client computer, as described in more detail herein above.

At block 630, the terminal server may receive a terminal service client response to the API request. In an illustrative example, the intercepted API call may include a request to retrieve an item from the credential database may specify the resource (e.g., an online service) for which the credentials are requested, and the response to the API call may include the account identifier and the password associated with the specified resource.

At block 640, the terminal server may forward the intercepted API request to the credential manager API implemented by the terminal session, as described in more detail herein above.

At block 650, the terminal server may receive a credential manager response to the API request, as described in more detail herein above.

At block 660, the terminal server may select, among the responses returned by the terminal service client application and the credential manager API, the response having the most recent timestamp. In certain implementations, responsive to determining that a timestamp associated with the credential manager response is more recent than a timestamp associated with the terminal service client application response, the terminal server may forward at least part of the credential manager response to the terminal service client application for updating the client credential database, as described in more detail herein above.

At block 670, the terminal server may forward the selected response to the hook module of the browser, and the method may terminate. The browser may forward the credentials (e.g., the account identifier and the associated password) provided by the response to the login page of the online service that has requested the login credentials.

Figure 7:
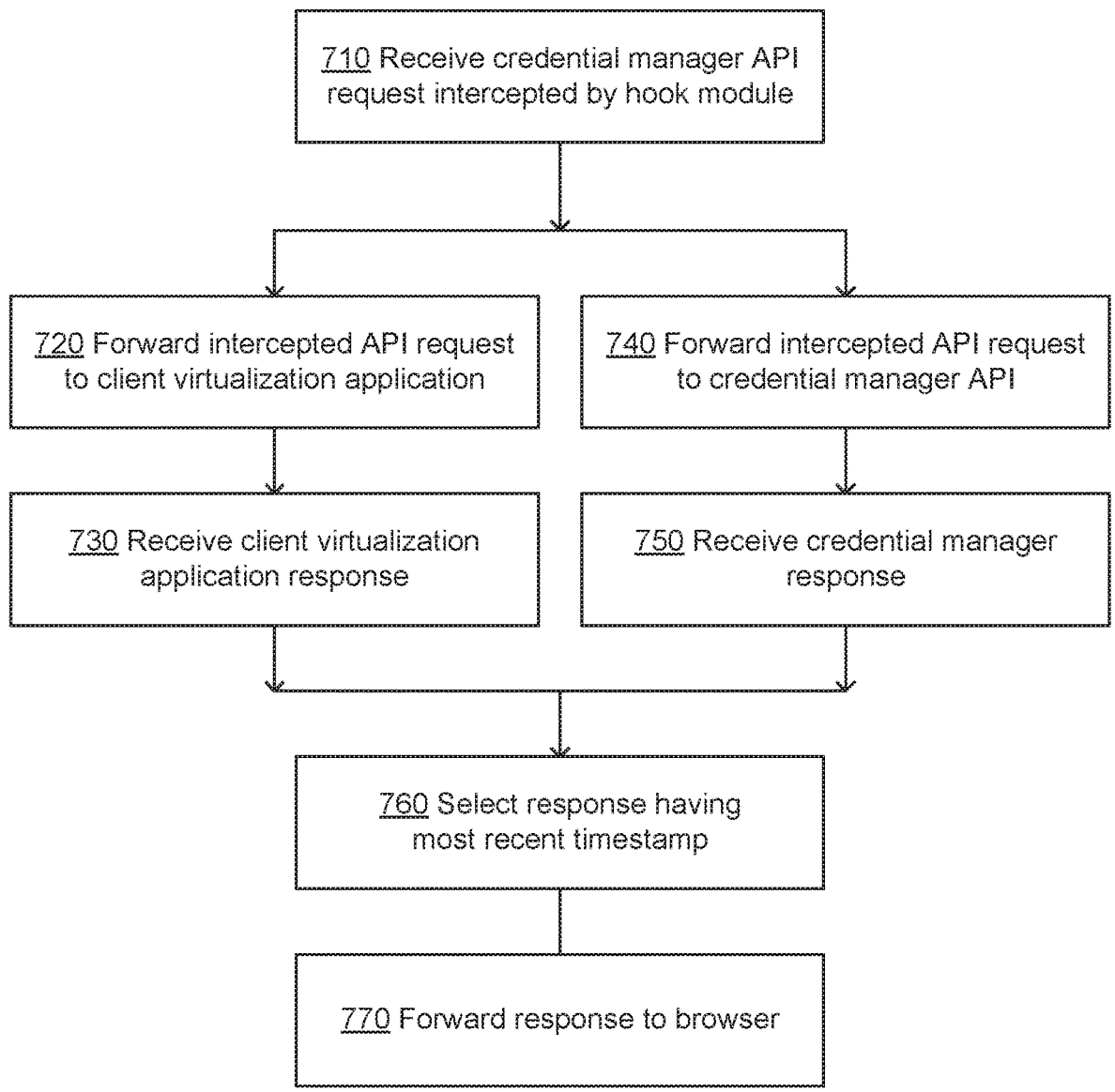
FIG. 7 depicts a flow diagram of an example method of browser credential management for virtual execution environments (such as virtual machines or terminal sessions), in accordance with one or more aspects of the present disclosure.

FIG. 7 depicts a flow diagram of an example method 700 of browser credential management for virtual execution environments (such as virtual machines or terminal sessions), in accordance with one or more aspects of the present disclosure. The method 700 and/or each of its individual functions, routines, subroutines, or operations may be performed by the plug-in installation service 310 of FIG. 3 running in a virtual execution environment. In certain implementations, the method 700 may be performed by a single processing thread. Alternatively, the method 700 may be performed by two or more processing threads, each thread executing one or more individual functions, routines, subroutines, or operations of the method. In an illustrative example, the processing threads implementing the method 700 may be synchronized (e.g., using semaphores, critical sections, and/or other thread synchronization mechanisms). Alternatively, the processing threads implementing method 700 may be executed asynchronously with respect to each other.

At block 710, a virtualization server application (e.g., represented by a VMM or a terminal server) may receive a credential manager API request intercepted by a hook module installed into a browser running in a virtual execution environment managed by the virtualization server. In various illustrative examples, the virtual execution environment may be provided by a virtual machine managed by the VMM or a terminal session managed by the terminal server, as described in more detail herein above. The intercepted credential manager API request may include a request to enumerate items in a credential database, a request to find items in the credential database, a request to retrieve an item from the credential database, a request to add an item to the credential database, and/or a request to remove an item from the credential database.

At block 720, the virtualization server application may forward the intercepted API request to the associated virtualization client application. In various illustrative examples, the virtualization client application may be provided by a VM client application or a terminal service client application, as described in more detail herein above.

At block 730, the virtualization server application may receive a virtualization client response to the API request. In an illustrative example, the intercepted API call may include a request to retrieve an item from the credential database may specify the resource (e.g., an online service) for which the credentials are requested, and the response to the API call may include the account identifier and the password associated with the specified resource.

At block 740, the virtualization server application may forward the intercepted API request to the credential manager API implemented by the virtual execution environment, as described in more detail herein above.

At block 750, the virtualization server application may receive a credential manager response to the API request, as described in more detail herein above.

At block 760, the virtualization server application may select, among the responses returned by the virtualization client application and the credential manager API, the response having the most recent timestamp. In certain implementations, responsive to determining that a timestamp associated with the credential manager response is more recent than a timestamp associated with the virtualization client application response, the virtualization server application may forward at least part of the credential manager response to the virtualization client application for updating the client credential database, as described in more detail herein above.

At block 770, the virtualization server application may forward the selected response to the hook module of the browser, and the method may terminate. The browser may forward the credentials (e.g., the account identifier and the associated password) provided by the response to the login page of the online service that has requested the login credentials.

Figure 8:
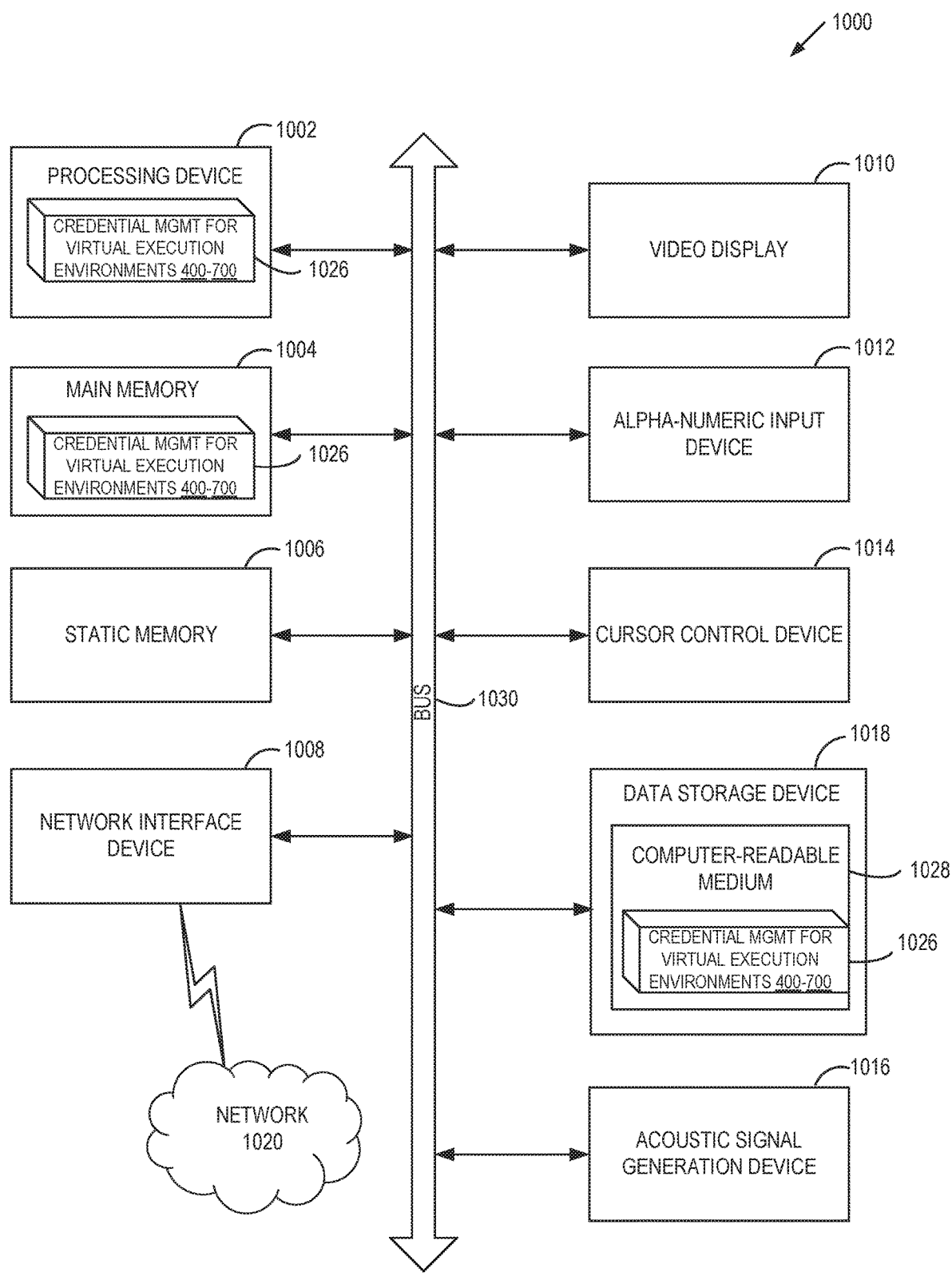
FIG. 8 depicts a block diagram of an example computer system operating in accordance with one or more aspects of the present disclosure.

FIG. 8 schematically illustrates a component diagram of an example computer system 1000 which may perform any one or more of the methods described herein. In various illustrative examples, the computer system 1000 may represent the example computer system 100 of FIG. 1.

The example computer system 1000 may be connected to other computer systems in a LAN, an intranet, an extranet, and/or the Internet. The computer system 1000 may operate in the capacity of a server in a client-server network environment. The computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

The computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

The processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, the processing device 1002 may be configured to execute instructions implementing the methods 400-700 for browser credential management for virtual execution environments.

The computer system 1000 may further comprise a network interface device 1008, which may be communicatively coupled to a network 1020. The computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

The data storage device 1018 may include a computer-readable storage medium (or more specifically a non-transitory computer-readable storage medium) 1028 on which is stored one or more sets of executable instructions 1026. In accordance with one or more aspects of the present disclosure, the executable instructions 1026 may comprise executable instructions encoding various functions of methods 400-700 for browser credential management for virtual execution environments.

The executable instructions 1026 may also reside, completely or at least partially, within the main memory 1004 and/or within the processing device 1002 during execution thereof by the computer system 1000, the main memory 1004 and the processing device 1002 also constituting computer-readable storage media. The executable instructions 1026 may further be transmitted or received over a network via the network interface device 1008.

While the computer-readable storage medium 1028 is shown in FIG. 8 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:

receiving, by a terminal session running on a terminal server, a credential manager API request intercepted by a hook module installed into a browser running within a terminal session managed by the terminal server;

forwarding the intercepted API request to a terminal service client application running on a client computer system;

receiving, from the terminal service client application, a client response to the intercepted API request;

producing, using the client response, a terminal server response to the intercepted API request; and forwarding the terminal server response to the hook module.

2. The method of claim 1, further comprising:

causing the terminal session to install the hook module into the browser to monitor browser-initiated requests to the credential manager API.

3. The method of claim 2, wherein installing the hook module further comprises:

responsive to detecting a new browser window being opened within the terminal session, installing the hook into a processing thread associated with the new browser window.

4. The method of claim 2, wherein installing the hook module further comprises:

responsive to detecting a new browser process having been initiated within the terminal session, installing the hook into a processing thread associated with the new browser process.

5. The method of claim 1, wherein producing the terminal server response further comprises:
forwarding the intercepted API request to a credential manager API;
receiving, from the credential manager API, a credential manager response to the intercepted API request;
selecting, among the client response and the credential manager response, a response having a more recent timestamp.

6. The method of claim 5, further comprising:
responsive to determining that a first timestamp associated with the credential manager response is more recent than a second timestamp associated with the client response, forwarding at least part of the credential manager response to the terminal service client application.

7. The method of claim 1, wherein the intercepted API request represents a request to perform one of: enumerate items in a credential database, find items in the credential database, retrieve an item from the credential database, add an item to the credential database, or remove an item from the credential database.

8. The method of claim 1, further comprising:
upon initializing the terminal session, communicating credential manager data stored in a local database of the client computer system to the credential manager API.

9. A system, comprising:
a memory; and
a processor coupled to the memory, wherein the processor is configured to:
receive a credential manager API request intercepted by a hook module installed into a browser running within a terminal session managed by a terminal server;
forward the intercepted API request to a terminal service client application running on a client computer system;
receive, from the terminal service client application, a client response to the intercepted API request;
produce, using the client response, a terminal server response to the intercepted API request; and
forward the terminal server response to the hook module.

10. The system of claim 9, wherein the processor is further configured to:
cause the terminal session to install the hook module into the browser to monitor browser-initiated requests to the credential manager API.

11. The system of claim 9, wherein producing the terminal server response further comprises:
forwarding the intercepted API request to a credential manager API;
receiving, from the credential manager API, a credential manager response to the intercepted API request;
selecting, among the client response and the credential manager response, a response having a more recent timestamp.

12. The system of claim 11, wherein the processor is further configured to:
responsive to determining that a first timestamp associated with the credential manager response is more recent than a second timestamp associated with the client response, forward at least part of the credential manager response to the terminal service client application.

13. The system of claim 9, wherein the intercepted API request represents a request to perform one of: enumerate items in a credential database, find items in the credential database, retrieve an item from the credential database, add an item to the credential database, or remove an item from the credential database.

14. The system of claim 9, wherein the processor is further configured to:
upon initializing the terminal session, communicate credential manager data stored in a local database of the client computer system to the credential manager API.

15. A non-transitory computer-readable storage medium comprising executable instructions that, when executed by a computer system, cause the computer system to:
receive a credential manager API request intercepted by a hook module installed into a browser running within a terminal session managed by a terminal server;
forward the intercepted API request to a terminal service client application running on a client computer system;
receive from the terminal service client application, a client response to the intercepted API request;
produce, using the client response, a terminal server response to the intercepted API request; and
forward the terminal server response to the hook module.

16. The non-transitory computer-readable storage medium of claim 15, further comprising executable instructions that, when executed by the terminal server, cause the terminal server to:
cause the terminal session to install the hook module into the browser to monitor browser-initiated requests to the credential manager API.

17. The non-transitory computer-readable storage medium of claim 15, further comprising executable instructions that, when executed by the terminal server, cause the terminal server to:
forward the intercepted API request to a credential manager API;
receive, from the credential manager API, a credential manager response to the intercepted API request;
select, among the client response and the credential manager response, a response having a more recent timestamp.

18. The non-transitory computer-readable storage medium of claim 17, further comprising executable instructions that, when executed by the terminal server, cause the terminal server to:
responsive to determining that a first timestamp associated with the credential manager response is more recent than a second timestamp associated with the client response, forward at least part of the credential manager response to the terminal service client application.

19. The non-transitory computer-readable storage medium of claim 15, wherein
the intercepted API request represents a request to perform one of: enumerate items in a credential database, find items in the credential database, retrieve an item from the credential database, add an item to the credential database, or remove an item from the credential database.

20. The non-transitory computer-readable storage medium of claim 15, further comprising executable instructions that, when executed by the terminal server, cause the terminal server to:

upon initializing the terminal session, communicate credential manager data stored in a local database of the client computer system to the credential manager API.

\* \* \* \* \*